J. S. Preston,
Hay Loader.

No. 52601. Patented Feb 13, 1866.

Witnesses.

Inventor.
J. S. Preston

UNITED STATES PATENT OFFICE.

JOHN S. PRESTON, OF MECHANICSVILLE, PENNSYLVANIA.

IMPROVEMENT IN MACHINES FOR RAKING AND LOADING HAY.

Specification forming part of Letters Patent No. 52,601, dated February 13, 1866.

*To all whom it may concern:*

Be it known that I, JOHN S. PRESTON, of Mechanicsville, in the county of Bucks and State of Pennsylvania, have invented a new and Improved Device for Loading Hay; and I do hereby declare that the following is a full, clear, and exact description thereof, which will enable others skilled in the art to make and use the same, reference being had to the accompanying drawings, forming part of this specification, in which—

Figure 1:
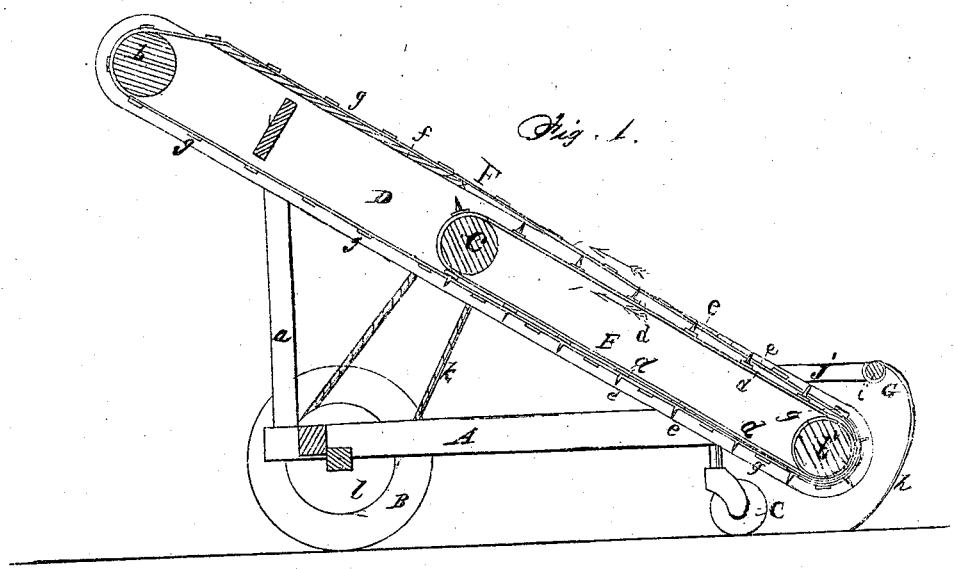
Figure 2:
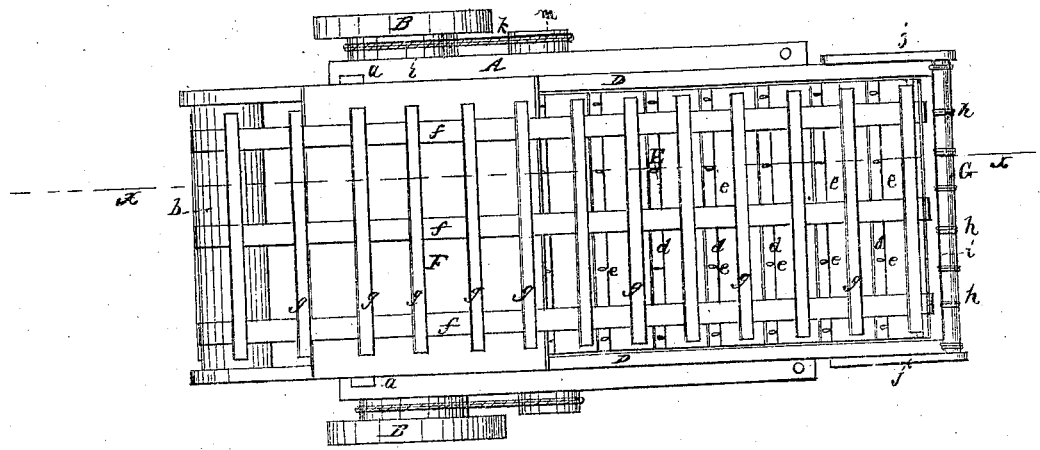

Figure 1 is a side sectional view of my invention, taken in the line $x\ x$, Fig. 2. Fig. 2 is a plan or top view of the same.

Similar letters of reference indicate like parts.

This invention relates to a new and improved device for raking and loading hay directly upon a wagon from the field.

The device is designed to be attached to the wagon and drawn along with it; and it consists in a frame mounted on wheels provided with an endless toothed apron, an inclined endless elevator, and a rake, all arranged and combined to operate in the manner substantially as hereinafter set forth.

A represents a horizontal frame, which is mounted on four wheels, B B C C, the latter being at the rear of the frame and arranged so as to turn, and are such as are commonly termed "caster-wheels." The wheels B B are much larger than the wheels C C, and are placed on fixed axles.

D D represent two inclined side pieces, the lower ends of which are attached to the rear part of the frame A, and the front parts sustained by uprights $a\ a$, secured to the front part of frame A. Between the upper and lower parts of these side pieces there are placed rollers $b\ b'$, and a roller, $c$, is placed between, about at their center.

E is an endless apron, which works over the rollers $c\ b'$, and has transverse slats $d$ attached to it at suitable distances apart, provided with teeth $e$.

F represents an endless elevator, which works over the rollers $b\ b'$, and is constructed of a series of longitudinal straps or belts, $f$, with slats $g$ secured transversely to them, the teeth $e$ of the apron E working in the spaces formed by the belts and slats of the elevator. This elevator, it will be seen, extends the whole length of the side pieces, D D, and over the endless toothed apron E. The roller $c$ is placed in such a position between the side pieces, D D, that the apron E will be slightly out of line with the elevator, said apron gradually receding from the elevator from its lower to its upper part, so that the teeth $e$, before they reach the roller $c$, will be out from the elevator and entirely free from it, as will be fully understood by referring to Fig. 1.

G represents a rake which is composed of a series of wire teeth, $h$, attached to a head, $i$, the ends of which are secured in arms $j\ j$, the inner ends of the latter being pivoted to the side pieces, D D. This rake works over or at the lower part of the elevator and toothed apron, and the pivoted arms $j\ j$ admit of it rising and falling to conform to the inequalities of the ground over which it may pass.

The device is attached to the rear end of a wagon, the upper part of the elevator F projecting over the latter and at a height above it corresponding to the height it is designed to have the load.

As the wagon is drawn along the rake G gathers or rakes up the hay to the lower part of the endless toothed apron E, the latter as well as the elevator being moved in the direction indicated by the arrow by a band, $k$, which passes around a pulley, $l$, attached to one of the wheels B, and around a pulley, $m$, at one end of the shaft of roller $c$.

The hay gathered or raked up by the rake G is caught by the apron E and brought upon the elevator F, the teeth $e$, after performing this work, gradually withdrawing themselves from the spaces in the elevator, so as to be entirely free from it before they reach the roller $c$, so that they can pass over or around it.

The elevator conducts the hay upward and discharges it over the roller $b$ into the wagon, the hay being properly distributed in the latter by an attendant.

The caster-wheels C C admit of the device swinging around whenever the wagon is turned.

I do not claim, broadly, an endless toothed apron and a rake placed on a mounted frame attached to a wagon, and arranged so as to load the latter with hay as it is drawn over the field, for that is an old device and has been previously used; but I do claim as new and desire to secure by Letters Patent—

The endless toothed apron E, when used in connection with the endless elevator F, and arranged so that the teeth of the apron will be withdrawn from the elevator at a certain point, in combination with the rake G, all being applied to a mounted frame and arranged to operate substantially as set forth.

JOHN S. PRESTON.

Witnesses:
 JONATHAN SHAW,
 J. G. CONRAD.